(12) United States Patent
Walter et al.

(10) Patent No.: US 8,152,381 B2
(45) Date of Patent: Apr. 10, 2012

(54) ROLLING BEARING COMPRISING A DEVICE FOR WITHDRAWING A LIQUID

(75) Inventors: Wilhelm Walter, Poppenhausen (DE); Alexander Haepp, Hofheim (DE); Erwin Hartmann, Bergrheinfeld (DE)

(73) Assignee: Schaeffler KG, Herzogenaurach (DE)

( * ) Notice: Subject to any disclaimer, the term of this patent is extended or adjusted under 35 U.S.C. 154(b) by 458 days.

(21) Appl. No.: 12/522,757

(22) PCT Filed: Dec. 19, 2007

(86) PCT No.: PCT/DE2007/002293
§ 371 (c)(1),
(2), (4) Date: Jul. 10, 2009

(87) PCT Pub. No.: WO2008/083656
PCT Pub. Date: Jul. 17, 2008

(65) Prior Publication Data
US 2010/0111457 A1 May 6, 2010

(30) Foreign Application Priority Data
Jan. 13, 2007 (DE) .......................... 10 2007 001 963

(51) Int. Cl.
*F16C 19/52* (2006.01)
*F16C 33/78* (2006.01)
(52) U.S. Cl. ....................................... 384/448; 384/477

(58) Field of Classification Search .................. 384/448, 384/477, 478, 484–486
See application file for complete search history.

(56) References Cited

U.S. PATENT DOCUMENTS

| 3,510,138 A | 5/1970 | Bowen |
| 5,434,503 A | 7/1995 | Rigaux et al. |
| 5,695,289 A * | 12/1997 | Ouchi et al. .................. 384/448 |
| 6,323,640 B1 * | 11/2001 | Forestiero et al. ............ 384/448 |

FOREIGN PATENT DOCUMENTS

| DE | 87 07 880 DA | 8/1987 |
| DE | 197 54 400 Y | 6/1999 |
| DE | 10 2004 026 199 DY | 12/2005 |
| JP | 2003 3 36 654 Y | 11/2003 |
| JP | 2005 009525 X | 1/2005 |
| JP | 2006 144992 X | 6/2006 |
| WO | 2006122915 DY | 11/2006 |

* cited by examiner

*Primary Examiner* — Thomas R Hannon
(74) *Attorney, Agent, or Firm* — Lucas & Mercanti, LLP

(57) ABSTRACT

A rolling bearing which has a sealing arrangement and a sensor component, particularly an encoder, which is fitted with a mounting flange. The rolling bearing further has an inner ring and an outer ring between which rolling members are arranged. The sealing arrangement is equipped with at least one sealing element between the inner ring and the outer ring. In order to provide a rolling bearing which can easily be retrofitted with a retrofit sensor, particularly a retrofit encoder, and is well protected against environmental influence, the sensor component that is fitted with the mounting flange is designed as a retrofit part, while at least one water discharge port is disposed in the region of the mounting flange.

15 Claims, 2 Drawing Sheets

ROLLING BEARING COMPRISING A DEVICE FOR WITHDRAWING A LIQUID

This application is a 371 of PCT/DE2007/002293 filed Dec. 19, 2007, which in turn claims the priority of DE 10 2007 001 963.9 filed Jan. 13, 2007, the priority of both applications is hereby claimed and both applications are incorporated by reference herein.

FIELD OF THE INVENTION

The invention relates to a rolling bearing having a seal arrangement and having a sensor component which has a fastening flange, with the rolling bearing having an inner ring and an outer ring, between which are arranged rolling bodies, and in which the seal arrangement is provided with at least one seal element between the inner ring and outer ring.

BACKGROUND OF THE INVENTION

It is generally known that rolling bearings for passenger motor vehicles or other vehicles can be fitted with a so-called encoder. An encoder has a sensor for measuring the rotational speed of a rotatable component, with the knowledge of which driving-stability-relevant signals for associated actuators can be generated in a control and regulating unit.

For example, DE 10 2004 026 199 A1 presents a rolling bearing arrangement with an encoder. The encoder is arranged on a bearing inner ring axially between a bearing outer ring and a radial flange for fastening a vehicle wheel. Here, the encoder is integrated in a seal arrangement which comprises a plurality of sealing lips in order to protect the rolling bearing from environmental influences. In said solution, it is difficult to retrofit a conventional bearing with an encoder. Furthermore, the proposed solution is of comparatively complex structural design, which undesirably increases production and assembly costs.

Furthermore, the utility model DE 87 07 880 U discloses a bearing whose seal is improved with the aim of preventing an accumulation of drain water in a gap region on the bearing outer ring. For this purpose, the outer ring is provided, in the region of a gap, with an inwardly inclined conical section on an outer lateral surface. In this way, drain water can flow out of the gap in the upper region of the outer ring when the outer ring is stationary, and can subsequently flow around the lateral surface of the outer ring under the force of gravity, and then drain down. A rotating inner ring promotes a centrifuging action. Said solution is intended to keep drain water away from the bearing interior, as a result of which the service life of the bearing is to be increased.

OBJECT OF THE INVENTION

The object on which the invention is based is that of proposing a generic rolling bearing which permits simple retrofitting with a retrofittable encoder and which is well protected from environmental influences and therefore has a long service life.

SUMMARY OF THE INVENTION

The invention is based on the realization that retrofittable parts or attachment parts on a rolling bearing promote the formation of a so-called water sack. A water sack of said type is an undesired accumulation of liquid which usually forms between the outwardly pointing end side of the rolling bearing and that end side of the attachment part which points toward the rolling bearing. The formation of a water sack can be prevented by utilizing centrifugal forces if it is made possible for the liquid accumulation to flow out.

The invention therefore proceeds, according to the features of claim 1, from a rolling bearing having a seal arrangement and having a sensor component which has a fastening flange, with the rolling bearing having an inner ring and an outer ring, between which are arranged rolling bodies, and in which the seal arrangement is provided with at least one seal element between the inner ring and outer ring. It is also provided that the sensor component which has the fastening flange is designed as a retrofittable part, and that at least one water outflow opening is arranged in the region of the fastening flange.

Since, according to the invention, the sensor component which has the fastening flange is designed as a retrofittable or attachment part and water outflow openings are arranged in the region of the fastening flange, it is possible firstly for a structurally simple rolling bearing to be retrofitted with an encoder as a sensor component, and secondly for drain water to flow out, or be centrifuged out, through the water outlet openings. It is thus made possible for water which has entered into the region between the rolling bearing and the encoder to flow out, with a centrifugal force effect additionally promoting the outflow of water when the bearing ring is rotating.

By means of said design, it is achieved that no drain water can collect in the region of the fastening flange of the retrofittable part, in particular of an encoder flange.

According to one refinement of the invention, it is provided that the water outflow openings are arranged in the region of the rotatable bearing ring. In this way, the outflow opening is arranged relatively far outward, such that centrifugal forces act with the greatest intensity in the region of said water outflow openings. This promotes an outflow of water.

According to one preferred embodiment, the fastening flange can be fastened to the radial outer surface of the rotatable bearing ring, as a result of which it is relatively easily possible to retrofit or add an encoder to a rolling bearing. The retrofittable component is designed in particular as an encoder or as an MP encoder which is known per se.

A particularly simple and reliable fastening structure of the encoder is provided, according to a further embodiment of the invention, if the fastening flange has an annular-disk-shaped part with an encircling, axially extending collar web, such that the latter can be fastened to the rotatable bearing ring by means of an interference fit. Even though the encoder is fastened to the outside without additional fastening means, said encoder is held securely by means of a component which is simple and cheap to produce.

The sensor component may particularly preferably be an encoder, in particular an encoder component, and/or an electronic rotational speed sensor.

In order that water or any other liquid can flow out more effectively, it is advantageously provided that the fastening flange forms, with the seal arrangement, a radial air inlet gap which is connected to a radially inner ventilation opening and at least one radially outer water outflow opening. As a result of the ventilation opening, the formation of a vacuum is prevented in the flange region, that is to say the outflowing liquid can be replaced with air flowing in through the ventilation opening.

If the outer ring is the rotatable component of the rolling bearing, the invention provides that the at least one water outflow opening is arranged on the rotatable outer ring. In the case of a rotatable inner ring, said at least one outflow opening will be provided on the inner ring.

For the design of the openings according to the invention, several variants are possible.

One preferred variant consists in that a plurality of radial and/or axial grooves for an outlet of water are provided on the rotatable outer ring, which grooves are flow-connected to the at least one water outflow opening. In said embodiment, no additional outflow openings are required on the fastening flange of the retrofittable encoder, but the grooves are of substantially L-shaped design as viewed in longitudinal section through the rolling bearing, having a radial section, which adjoins the annular-disk-shaped part of the fastening flange, and having an axial section, which adjoins the encircling collar web of the fastening flange. Here, the collar web of the fastening flange is axially shorter than the axial section of the grooves, in such a way that an area of the grooves which is not covered by the collar web forms the at least one water outflow opening in each case. The grooves are very effective with regard to their function, and can be generated in a cost-neutral fashion during the forging process of the rotatable bearing ring.

In another variant of the invention, the water outflow openings, in particular outflow bores, are formed on the fastening flange. For this purpose, the sheet metal of the fastening flange is provided with bores in an additional machining step. The advantage of said solution is that no structural changes are necessary to the outer ring of an associated rolling bearing. The water outflow openings may be arranged or formed on the annular-disk-shaped part of the fastening flange and/or on the encircling annular collar web of the fastening flange.

In a further refinement of the rolling bearing according to the invention, it is provided that an annular-disk-shaped part of the fastening flange extends radially from the seal arrangement, with an inner edge of the annular-disk-shaped part being situated in a central region of the seal arrangement. In this way, air is practically sucked into the seal arrangement by the suction effect of the radially outflowing water, with drain water being effectively kept away from the seal arrangement, which leads to a long service life of the seal of the bearing.

BRIEF DESCRIPTION OF THE DRAWINGS

The invention is explained in more detail below on the basis of the appended drawing of an exemplary embodiment. In the drawing.

DETAILED DESCRIPTION OF THE DRAWINGS

Figure 1:
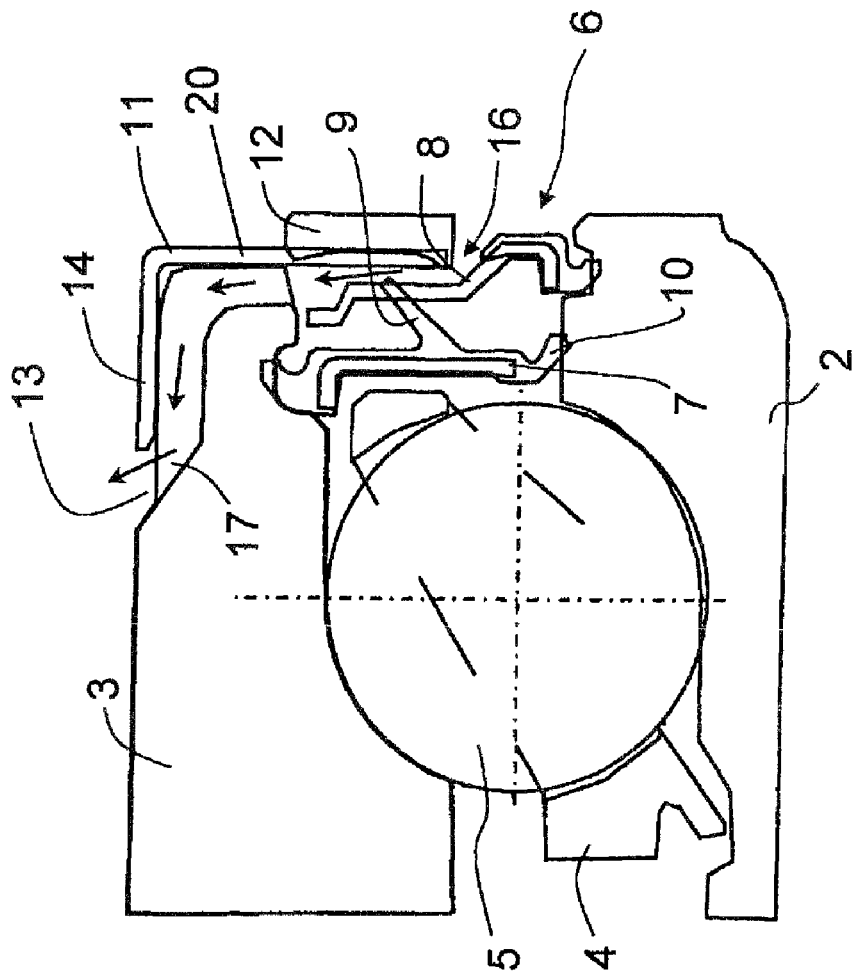
FIG. 1 shows a sectioned illustration of a first embodiment of the rolling bearing according to the invention.

In the figures, identical parts are provided with the same reference symbols. The rolling bearing 1 illustrated in FIG. 1 has an inner ring 2, an outer ring 3 and a cage 4 which is arranged between the inner ring 2 and outer ring 3 and has rolling bodies 5 which are embodied as balls. The rolling bearing 1 is also fitted with a seal arrangement 6 which prevents the infiltration of water and dirt into the bearing. Said seal arrangement 6 is provided with a plurality of elastic seal elements 7 and 8 and with one or more elastic sealing lips 9, 10. The rolling bearing 1 is embodied as a radial ball bearing for a motor vehicle.

In order to be able to electronically measure the rotational speed of a component which is mounted by means of the rolling bearing 1, for example for ABS, ASR and/or ESP purposes (ABS=anti-lock braking system, ASR=anti-slip regulation, ESP=electronic stability program regulation), a so-called encoder is arranged on the rolling bearing 1.

Said encoder comprises an encoder component 12 which has a fastening flange 11 and which is embodied as a sectored, ferromagnetic coating which can be detected by a measuring device. The fastening flange 11 consists of an annular-disk-shaped part 20 having an encircling collar web 14 which extends axially over a section of the outer ring 3.

According to the invention, the encoder component 12 which has the fastening flange 11 is designed as a retrofittable part or attachment part. Furthermore, according to the invention, water outflow openings 13 are arranged in the region of the fastening flange 11, which water outflow openings 13 prevent the formation of liquid accumulations between the fastening flange 11 and the seal 6.

Figure 3:
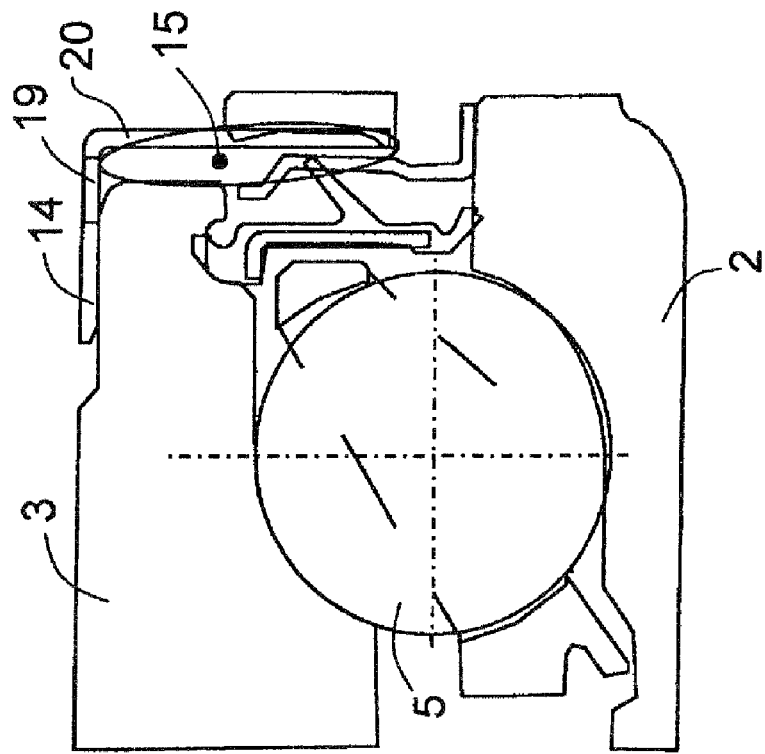
FIG. 3 shows a third embodiment of the rolling bearing according to the invention.
Figure 2:
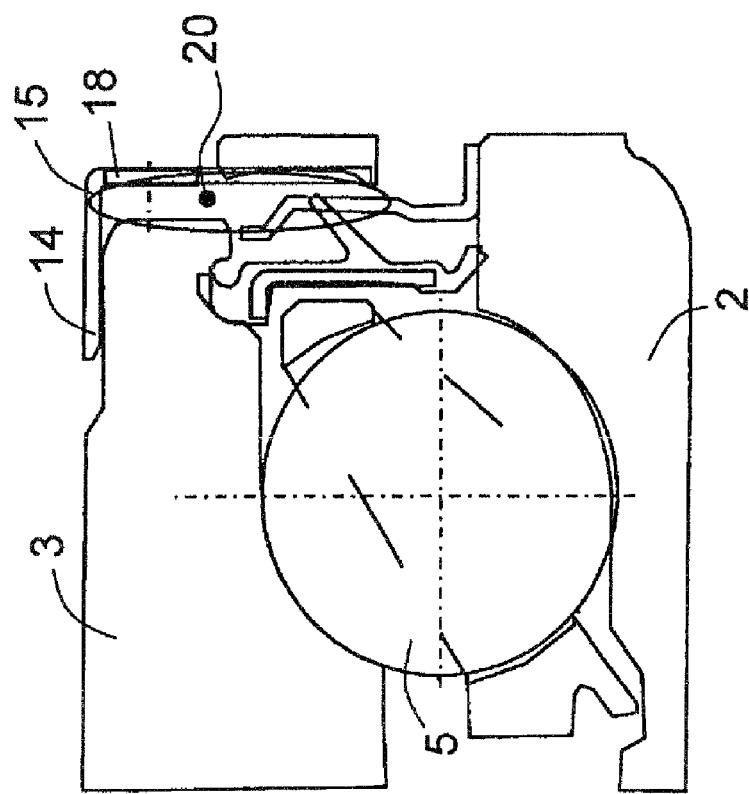
FIG. 2 shows a sectioned illustration of a second embodiment of the rolling bearing according to the invention.

As shown by the arrows in FIG. 1, dirty water, or a water accumulation 15 which has formed between the fastening flange 11 and the seal arrangement 6, as indicated in FIGS. 2 and 3 by an ellipse, can flow out. The water is practically centrifuged outward through the water outflow openings 13 by means of the centrifugal force.

The water outflow openings 13 are preferably arranged in the region of the rotatable bearing ring, in this case the outer ring 3, with the encoder 12 rotating with the outer ring 3. The fastening flange 11 is arranged on the outer side of the outer ring 3 and is designed as an annular-disk-shaped part with an encircling axial collar web 14, such that the latter can be plugged onto the outer ring 3 with an interference fit.

As shown in FIG. 1, the fastening flange 11 forms, with the seal arrangement 6, a radially extending air inlet gap which has, radially at the inside, a ventilation opening 16 for the inlet of air in order to promote the outflow of water radially outward through the water outflow openings 13.

In the variant illustrated in FIG. 1, the water outflow openings 13 are formed on the outer ring 3. For this purpose, the outer ring 3 is provided with grooves 17 which are of L-shaped design as viewed in a longitudinal section of the rolling bearing 1 and which extend radially on an end-side surface of the outer ring 3 and axially in the region of the said interference fit for the collar web 14. When the outer ring 3 is rotating, dirty water is therefore first guided radially outward and then moved axially to the water outflow openings 13.

In order that the ducts created by the grooves 17 and the fastening flange 11 are not completely covered radially at the outside by the fastening flange 11, the collar web 14 of the fastening flange 11 is axially shorter than the grooves 17 in the outer lateral surface of the outer ring 3. Those areas of the axial groove sections which are not covered by the collar web 14 therefore form the water outflow openings 13.

Alternatively or in addition to the grooves 17 which are open at their axial ends, the water outflow openings may be arranged or formed on the fastening flange 11 itself, as shown in FIGS. 2 and 3.

Said water outflow openings 18, 19 are punched or drilled into the fastening flange 11.

The water outflow openings 18 are formed, in FIG. 2, on the annular-disk-shaped part 20, and in FIG. 3, on the encircling axial collar web 14 of the fastening flange 11 (water outflow openings 19). A combination of the three variants of the water outflow openings 13, 18, 19 is possible and is also encompassed by the invention.

The invention is not restricted only to the examples shown. For example, instead of an encoder, it is also possible for some other retrofittable part or attachment part, in particular some other sensor component, to be provided. It is also possible for some other seal arrangement, some other encoder fastening solution or some other bearing design or rolling body design to be provided.

LIST OF REFERENCE SYMBOLS

1 Rolling bearing
2 Inner ring
3 Outer ring
4 Cage
5 Rolling bodies, ball
6 Seal arrangement
7 Seal element
8 Seal element
9 Seal lip
10 Seal lip
11 Fastening flange
12 Encoder component
13 Water outflow opening
14 Collar web
15 Water sack
16 Ventilation opening
17 Forged groove
18 Water outflow opening in the fastening flange
19 Water outflow opening in the fastening flange
20 Annular-disk-shaped part

The invention claimed is:

1. A rolling bearing, comprising: a seal arrangement; a sensor component which has a fastening flange; an inner ring; and an outer ring, between the inner ring and the outer ring are arranged rolling bodies and the seal arrangement having at least one seal element, wherein the sensor component, which has the fastening flange, is designed as a retrofittable part, and in that at least one water outflow opening is arranged in the region of the fastening flange.

2. The rolling bearing as claimed in claim 1, wherein the water outflow opening is arranged in the region of the outer ring.

3. The rolling bearing as claimed in claim 1, wherein the fastening flange is fastened to a radial outer surface of the outer ring.

4. The rolling bearing as claimed in claim 3, wherein the fastening flange has an annular-disk-shaped part with an encircling, axially extending collar web, such that the latter can be fastened to the outer ring by means of an interference fit.

5. The rolling bearing as claimed in claim 4, wherein the annular-disk-shaped part of the fastening flange extends radially from the seal arrangement, with an inner edge of the annular-disk-shaped part being situated in a central region of the seal arrangement.

6. The rolling bearing as claimed in claim 1, wherein the fastening flange forms, with the seal arrangement, a radial air inlet gap which is connected to a radially inner ventilation opening and the water outflow opening.

7. The rolling bearing as claimed in claim 1, wherein the sensor component is an encoder an electronic rotational speed sensor.

8. The rolling bearing as claimed in claim 1, wherein the water outflow opening is arranged on the outer ring.

9. The rolling bearing as claimed in claim 8, wherein a plurality of radial and/or axial grooves for an outlet of water are provided on the outer ring, and the grooves are flow-connected to the water outflow opening.

10. The rolling bearing as claimed in claim 9, wherein the grooves are of substantially L-shaped design as viewed in longitudinal section through the rolling bearing, having a radial section, which adjoins an annular-disk-shaped part of the fastening flange, and having an axial section, which adjoins an encircling axial collar web of the fastening flange.

11. The rolling bearing as claimed in claim 10, wherein the collar web of the fastening flange is axially shorter than an axial section of the grooves, in such a way that an area of the grooves not covered by the collar web forms the water outflow opening in each case.

12. The rolling bearing as claimed in claim 1, wherein the water outflow opening is formed on the fastening flange in the form of outflow bores.

13. The rolling bearing as claimed in claim 12, wherein water outflow opening is formed on an annular-disk-shaped part of the fastening flange.

14. The rolling bearing as claimed in claim 12, wherein water outflow opening is formed on an encircling axial collar web of the fastening flange.

15. The rolling bearing as claimed in claim 1, wherein the roller bearing is designed as a motor vehicle rolling bearing.

* * * * *